United States Patent
Lewellyn

(10) Patent No.: US 10,493,806 B1
(45) Date of Patent: Dec. 3, 2019

(54) BEADLOCK ASSEMBLY

(71) Applicant: Harry Lewellyn, Costa Mesa, CA (US)

(72) Inventor: Harry Lewellyn, Costa Mesa, CA (US)

(*) Notice: Subject to any disclaimer, the term of this patent is extended or adjusted under 35 U.S.C. 154(b) by 260 days.

(21) Appl. No.: 15/634,536

(22) Filed: Jun. 27, 2017

(51) Int. Cl.
  *B60C 15/032* (2006.01)
  *B60C 15/02* (2006.01)
  *B60C 5/04* (2006.01)
  *B60C 15/028* (2006.01)

(52) U.S. Cl.
  CPC ............ *B60C 15/032* (2013.01); *B60C 5/04* (2013.01); *B60C 15/0206* (2013.01); *B60C 15/028* (2013.01)

(58) Field of Classification Search
  CPC ........... B60C 17/01; B60C 5/22; B60C 15/02; B60C 15/0206; B60C 15/0209; B60C 15/0213; B60C 15/028; B60C 15/032
  See application file for complete search history.

(56) References Cited

U.S. PATENT DOCUMENTS

| | | | | |
|---|---|---|---|---|
| 2,898,969 A * | 8/1959 | Pfeiffer | ...................... | B60C 5/22 152/341.1 |
| 3,191,654 A * | 6/1965 | Anderson et al. | ...... | B60C 17/01 152/341.1 |
| 3,476,168 A * | 11/1969 | Huber | ................... | B60C 29/007 137/234.5 |
| 3,935,892 A * | 2/1976 | Arimura | ................. | B60B 21/12 152/517 |
| 4,153,095 A * | 5/1979 | Sarkissian | ................. | B60C 5/20 152/504 |
| 4,263,953 A * | 4/1981 | Miceli | ..................... | B60C 17/10 152/158 |
| 4,995,438 A * | 2/1991 | Weber | .................... | B60C 17/01 152/158 |
| 5,246,050 A * | 9/1993 | Stucker | .................. | B60C 17/01 152/158 |
| 6,688,359 B2 * | 2/2004 | Blalock | ................... | B60C 17/01 152/340.1 |
| 7,131,477 B2 | 11/2006 | Smith | | |
| 9,669,661 B2 * | 6/2017 | Hachmeyer | ........... | B60C 29/007 |
| 2006/0283533 A1 * | 12/2006 | Zuigyou | .................. | B32B 5/02 152/340.1 |
| 2007/0295555 A1 * | 12/2007 | O'Rourke | .......... | A62B 35/0018 182/3 |

OTHER PUBLICATIONS

"Life Belts and Harnesses—their strength lies in stitching", Richard C. Murray, Oct. 1, 1984, pp. 1-13. (Year: 1984).*

\* cited by examiner

*Primary Examiner* — Jason R Bellinger

(57) ABSTRACT

A dual, internal, pneumatic, boltless beadlock assembly for effectively securing a tire to a rim is disclosed. The beadlock assembly exerts a force on the two circumferential inner beads of a tire such that the tire stays in secure contact with the rim, even when the inflation pressure of the tire is not sufficient to lock the tire to the rim.

9 Claims, 5 Drawing Sheets

KEY

| | |
|---|---|
| A | Tire tread |
| B | Tire sidewalls |
| C | Two tire beads – 136 |
| D | Beadlock tread – 110 |
| E1 | 1$^{st}$ beadlock sidewall – 122 |
| E2 | 2$^{nd}$ beadlock sidewall – 138 |
| F1 | 1$^{st}$ Beadlock bead – 140 |
| F2 | 2$^{nd}$ Beadlock bead – 142 |
| G | Rim bead bump |
| H | Inner tube valve stem – 106 |
| I | Inner tube – 134 |

BEADLOCK ASSEMBLY

FIELD OF THE INVENTION

The present invention relates to an automotive wheel, more specifically, to a beadlock assembly for maintaining a tire on a rim when the pressure of said tire is not sufficient to secure the tire to the rim.

BACKGROUND OF THE INVENTION

Pneumatic beadlock devices have been in widespread use for several years. The devices are configured to secure the beads of a tire to a rim in situations where the pressure within the tire is insufficient, or additional securing force is needed to secure the tire beads behind the rim bead bumps. Pneumatic beadlock devices are often used to optimize driving performance and traction on nonconventional terrains and during driving off road or off road drag, oval, rally, outback challenge and all other racing disciplines where lower than normal tire inflation pressure is advantageous. Beadlock devices have been known to hold tire beads in place even for tire pressures as low as zero pounds per square inch ("psi").

There are five distinct categories of methods/devices, besides the pneumatic beadlock device, used to lock tire beads to a rim each described as follows:

(1) The conventional mechanical, beadlock rim. This device is the most common throughout all applications. A bolt circle lock ring mechanically clamps the outside tire bead to an inner portion of a specialized rim. Existing rims may also be converted to perform the function of a mechanical beadlock rim.

2) An alternate version of the conventional mechanical, beadlock rim configured to lock both the inside and outside of a tire's beads. This configuration requires increased inside lock ring space and specialized "inboard" brakes are required.

3) A plastic insert of a given diameter and width having a split rim (two piece rim), locking the inside of each tire bead to the inner tire bead seat surfaces of the rim. The plastic insert must be custom-fit to the thickness of the tire beads and each of the two rim pieces must be sealed with an O-ring.

4) Filling the air chamber of the tire with a solid-fill material that in essence, locks both tire beads to the rim. This method is most commonly used on earth moving equipment and in military applications.

5) A combination of a solid-fill, dual, internal bead lock with an inner/close to the rim solid chamber securing the tire beads to the rim and a main air chamber able to provide a "bullet proof" wheel that will accommodate tire pressure changes for the advantages of operating the wheel in a low-pressure regime.

One of the unique and inventive technical features of the present invention is an overlapping double-W stitching method joining the flat webbing overlap to form a cylindrical tread. A tremendous force is exerted on the ends of the tread at this webbing interface joint as a result of the relatively high inner tube pressure. Presently known prior references use multiple normal-to-the-tread webbing edge parallel stitches, which leads to eventual failure of the beadlock case and ultimately to a failure of the entire beadlock assembly. The double-W stitching, as used for sewing seatbelts and other strength-critical applications, provides a stronger interface joint, while also providing an increased bobbin tension that serves to bury the stitching. This burying of the stitching makes it less vulnerable to scuffing and wear that occurs when the tire goes flat and the vehicle weight crushes the inside of the tire tread into contact with the circumferential outside of the bead lock case tread.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a beadlock assembly, housed within a tire, surrounding a rim upon which the tire is mounted. The beadlock assembly may effectively secure both tire beads to the rim even when an inflation pressure of the tire is lower than the tire manufacturer's suggested operating inflation pressure. The beadlock assembly may comprise: an inner tube, a beadlock case, and a beadlock air channel. In some embodiments, the inner tube may encircle the rim and feature an inner tube valve stem mounted through the rim for allowing air to enter and exit the inner tube. In other embodiments, the beadlock air channel may join the tire's main air chamber to a tire valve stem mounted in the rim. The main air chamber is an airtight space between the tire, when inflated, and the rim. Air exiting (or entering) the main air chamber travels through the beadlock air channel and is released (or received) via the tire valve stem.

In additional embodiments, the beadlock case may encircle the inner tube and feature a beadlock tread disposed along the circumference of the beadlock case. A first beadlock sidewall, second beadlock sidewall, first beadlock bead, and second beadlock bead may further comprise the beadlock case. Thus, in essence, forming a tire within a tire.

In some embodiments, the beadlock tread may have a first circumferential edge and a second circumferential edge. Further, a first terminal end of the beadlock tread and a second terminal end of the beadlock tread may overlap such that a pre-determined distance exists between said first and second terminal ends. An overlap area, herein referred to as the tread overlap, comprising a double layer of the first synthetic material, may be defined by the pre-determined distance and a width of the beadlock tread.

In other embodiments, the beadlock case may further comprise a first beadlock sidewall disposed between the first circumferential edge of the beadlock tread and the rim and a second beadlock sidewall disposed between the second circumferential edge of the beadlock tread and the rim. Each sidewall is sewn to the under or inside of the beadlock tread.

Supplementary embodiments feature a first beadlock bead comprising a second synthetic material symmetrically or asymmetrically folded over a circumferential edge of the first beadlock sidewall and affixed to the first beadlock sidewall via a first stitching.

The first stitching may be disposed within a given distance from an edge of the first beadlock bead. Additionally, a second beadlock bead may comprise a third synthetic material symmetrically or asymmetrically folded over a circumferential edge of the second beadlock sidewall and affixed to the second beadlock sidewall via a second stitching. The second stitching may be disposed within a distance (equal to the previously mentioned given distance) from the edge of the second beadlock bead.

Consistent with previous embodiments, the beadlock assembly may be inserted into the tire and the inner tube may then be inflated via the inner tube valve stem to allow the beadlock assembly to contact the tire at the two inner circumferential tire beads. The beadlock assembly may exert a force, at said places of contact, such that the tire may stay in secure contact with the rim even in situations where the inflation pressure of the tire is not sufficient to lock the tire to the rim.

BRIEF DESCRIPTION OF THE DRAWINGS

The features and advantages of the present invention will become apparent from a consideration of the following detailed description presented in connection with the accompanying drawings in which.

DEFINITIONS

Figure 1:
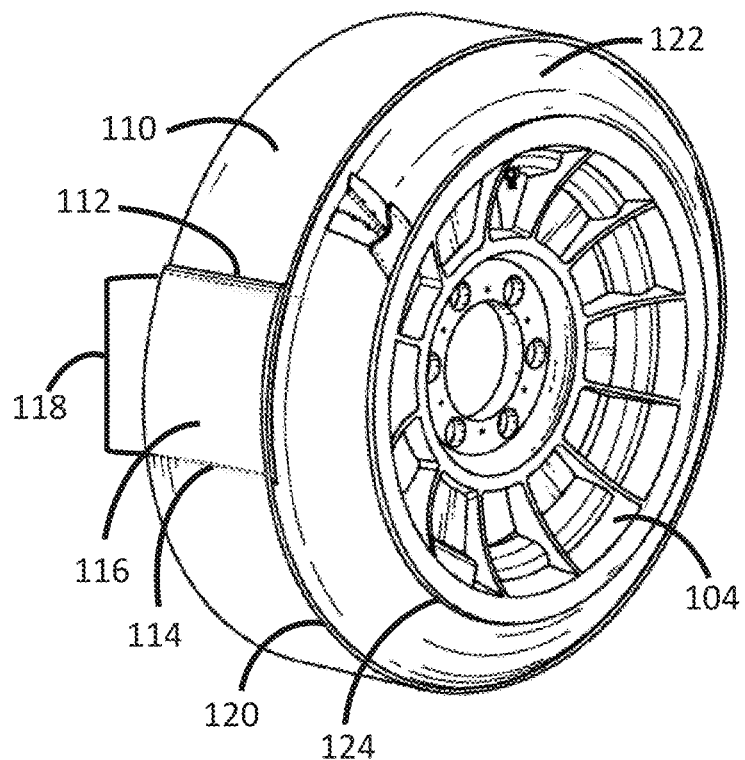
FIG. 1 shows an embodiment of the beadlock case of the present invention encompassing an inner tube (not shown) disposed on a rim.

As used herein, the term "tire" refers to the rubber part of an automotive wheel.

As used herein, the term "tread" refers to the relatively thick part of a tire that contacts the ground. The tread contains multiple layers of cords, one of which may be steel or other strengthening materials.

As used herein, the term "tire sidewall" refers to one of two relatively thin vertical sides of a tire. These contain cords, none of which are steel.

As used herein, the term "tire bead" refers to one of two internal diameters of a tire. They are usually thicker than the sidewalls and contain steel reinforcements. The sidewall cords are wrapped down and around the bead steel reinforcement.

As used herein, the term "rim" refers to the metal part of the wheel that accepts the tire and valve stem. The outer side of the rim to be the visible, lug nut side of the rim. The inner side of the rim is the brake, axle or spindle side of the rim. The portion that sees, or contains the inflation gas, (e.g. carbon dioxide, nitrogen, air, or other gases) is the drop center of the rim.

As used herein, the term "main air chamber" refers to the airtight chamber created when the entire rubber surface of the inflated tire is mounted on the rim.

As used herein, the term "tire valve stem" refers to a device mounted in the rim that allows air to enter and exit the main air chamber. For tubeless tires, it makes an airtight seal with the rim. It may be rubber or metal or a combination of rubber and metal.

As used herein, the term "valve core" refers to the inner part of the tire or inner tube valve stem that, when depressed, allows air in and out of either the main air chamber or inner tube. It seals the main air chamber or inner tube shut when not depressed.

As used herein, the term "rim bead bump" refers to the part of the rim that seats the tire bead. The rim bead bump partially locks the inflated tire onto the rim. However, at low tire pressures, the tire can pop off of the rim thereby completely flattening the tire's main air chamber. The tire bead seating areas on the rim are made up of vertical and horizontal/axial surfaces just inside of the outermost, horizontal, rim surfaces, in both directions, from the rim's lug nut and brake sides. The bead bumps are independent and inside/at the end of (in both directions, toward the center of a rim's drop center) the rim's, horizontal, tire bead seating surfaces. The bead bumps terminate the tire bead seating surfaces.

As used herein, the term "wheel" refers to an assemblage of the tire and tire valve stem with or without the bead lock assembly disposed within.

As used herein, the term "beadlock case" refers to the "mini-tire" that mounts inside the tire. The beadlock case comprises: the beadlock tread, beadlock sidewalls, and beadlock beads. This case contacts the tire at the inside of the tire beads.

As used herein, the term "beadlock tread" refers to a woven, synthetic webbing material disposed along the circumference of the beadlock case.

As used herein, the term "beadlock sidewall" refers to either of the two relatively thin vertical sides of the beadlock case. Non-limiting examples of the beadlock sidewall material include, but are not limited to: a woven synthetic fabric, a natural fabric, or polyvinyl chloride ("PVC"). This basic, raw unassembled component is sometimes referred to as a "donut".

As used herein, the term "beadlock bead" refers to synthetic webbing material symmetrically or unsymmetrically folded and sewn to the internal circumference of a beadlock sidewall.

As used herein, the term "beadlock air channel" refers to a channel connecting the tire valve stem to the main air chamber via a crushproof and flexible air passage.

As used herein, the term "beadlock assembly" refers to the beadlock case, the inner tube, the associated valve stems, and the beadlock air channel.

As used herein, the term "tread overlap" refers to the portion of the flat tread webbing that overlaps to form the annular beadlock tread.

DETAILED DESCRIPTION OF THE INVENTION

Figure 2:
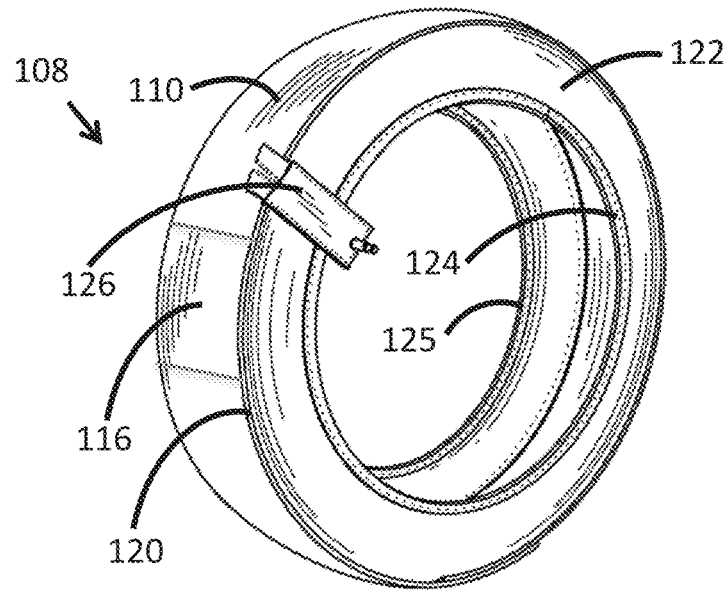
FIG. 2 shows an isolated view of an embodiment of the present beadlock case.
Figure 4:
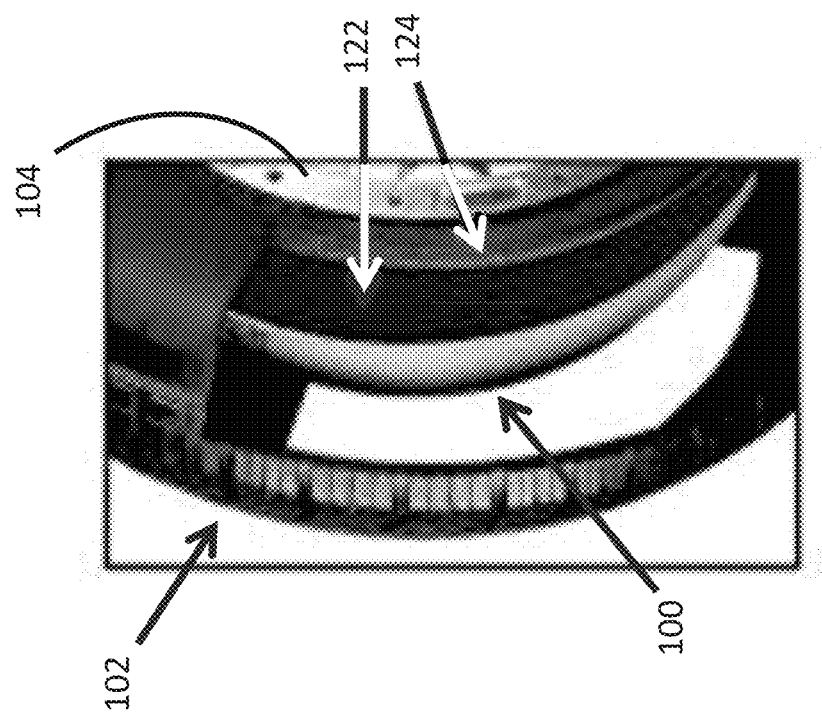
FIG. 4 shows the beadlock case of the present invention disposed within a tire and upon a rim.
Figure 3:
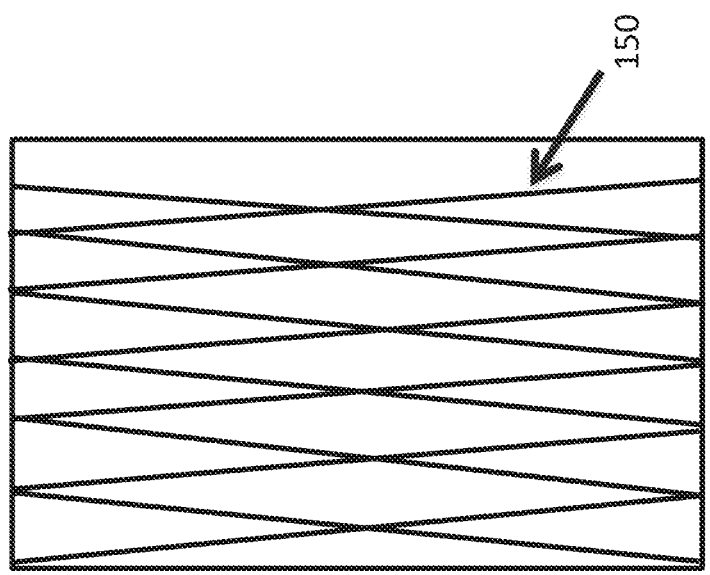
FIG. 3 shows the double-W stitching pattern disposed on the overlap area of the beadlock tread.
Figure 5:
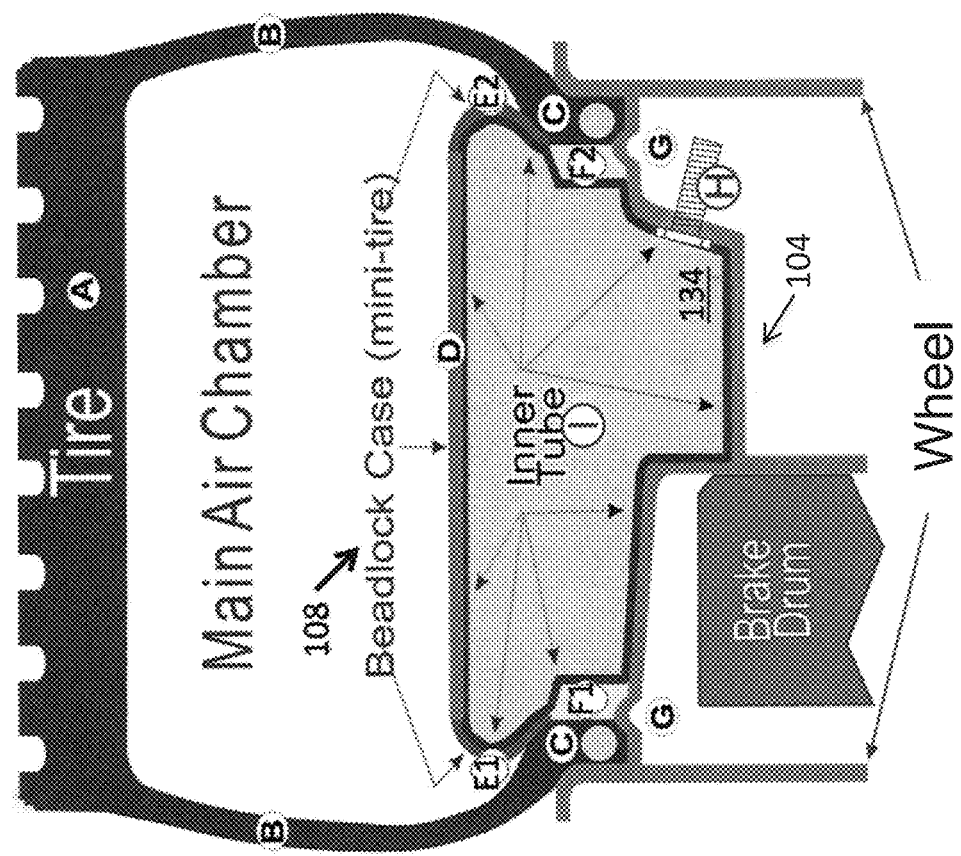
FIG. 5 is a diagrammatical representation of the beadlock assembly of the present invention.
Figure 6:
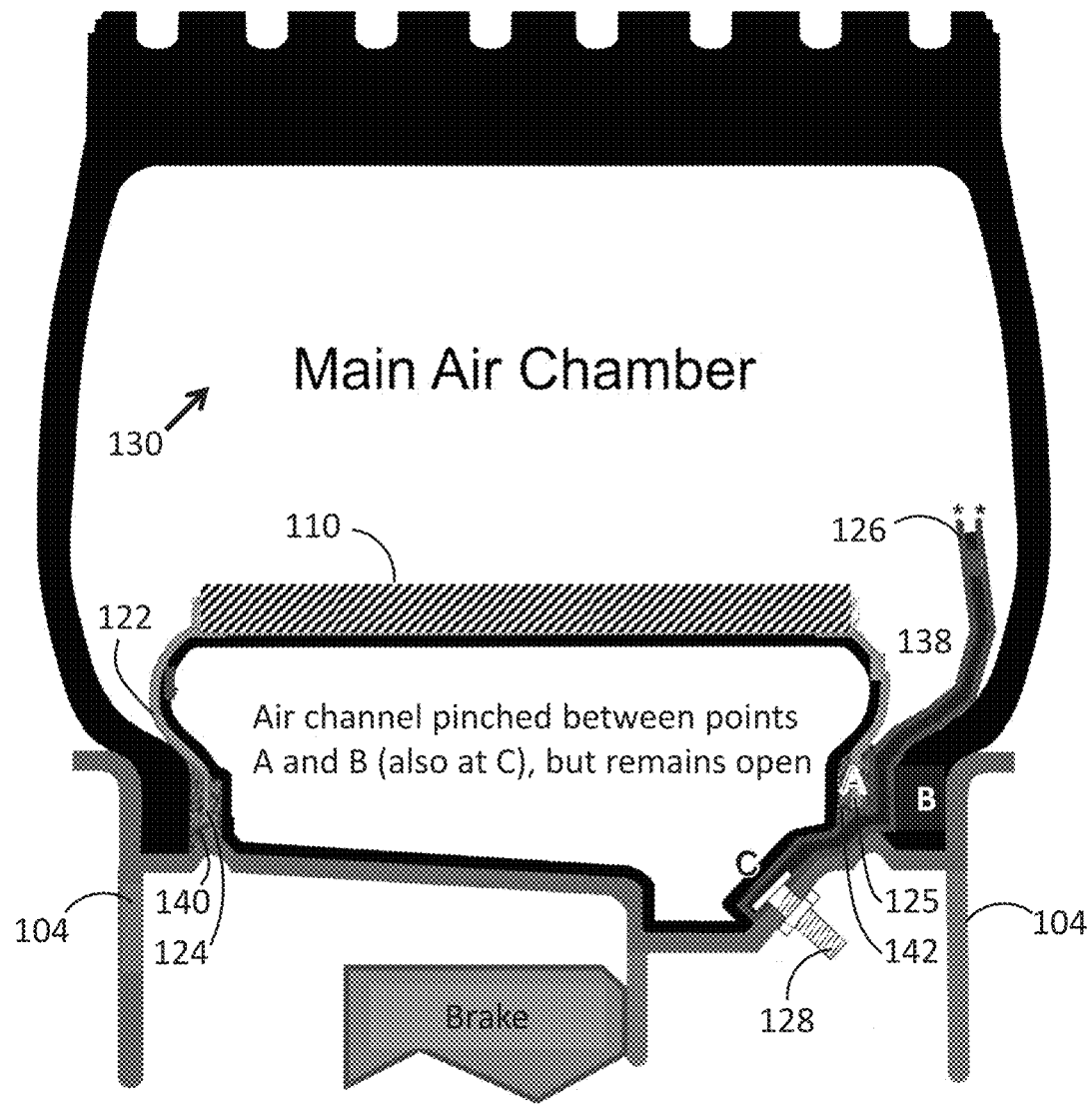
FIG. 6 is an alternative perspective of the diagrammatical representation of the beadlock assembly of the present invention.
Figure 7:
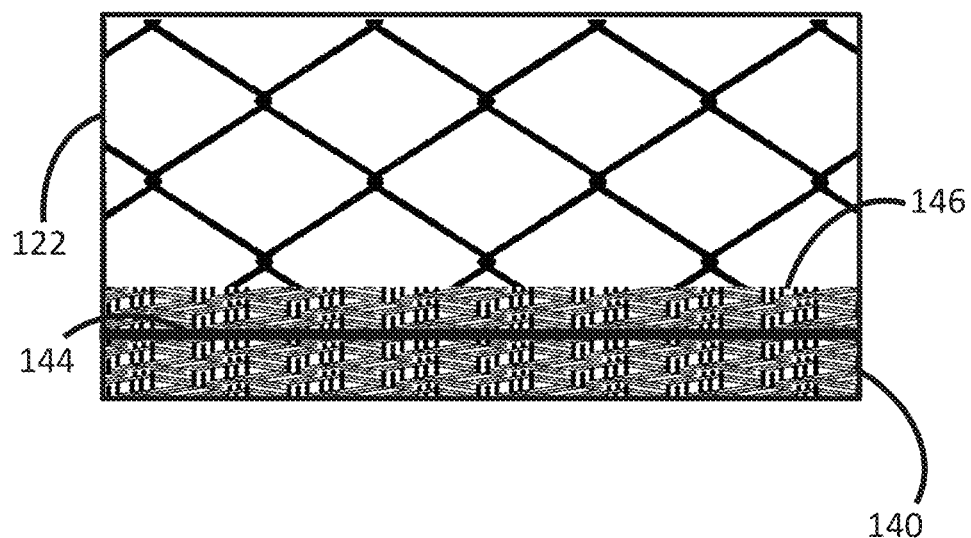
FIG. 7 shows stitching affixing the first beadlock bead to the first beadlock sidewall.

Following is a list of elements corresponding to a particular element referred to herein:
100 Beadlock assembly
102 Tire
104 Rim
106 Inner tube valve stem
108 Beadlock case
110 Beadlock tread
112 First terminal end of the beadlock tread
114 Second terminal end of the beadlock tread
116 Tread overlap area of the beadlock tread
118 Pre-determined distance between the first and second terminal ends of the beadlock tread
120 First circumferential edge of the beadlock tread
122 First beadlock sidewall
124 Circumferential edge of the first beadlock sidewall 125 Circumferential edge of the second beadlock sidewall
126 Beadlock air channel
128 Tire valve stem
130 Main air chamber
134 Inner tube
136 Two inner circumferential tire beads
138 Second beadlock sidewall
140 First beadlock bead
142 Second beadlock bead
144 First stitching affixing the first beadlock bead to the first beadlock sidewall
146 The edge of the first beadlock bead
150 Double-W stitching pattern Referring now to FIGS. 1-7, the present invention features a beadlock assembly (100), housed within a tire (102), surrounding a rim (104) upon which the tire (102) is mounted. The beadlock assembly (100) may effectively secure the tire (102) to the rim (104) even when an inflation pressure of the tire (102) is lower than the tire manufacturer's suggested operating inflation pressure. In some embodiments, the beadlock assembly (100) comprises an inner tube (134), having an inner tube valve stem (106), encircling the rim (104). The inner tube valve stem (106) may be mounted on the rim (104) and allow air to enter and exit the inner tube (134).

A beadlock case (108) may further comprise the beadlock assembly (100). In some embodiments, the beadlock case (108) encompasses the inner tube (134) and comprises a beadlock tread (110) disposed along the circumference of the beadlock case (108). The beadlock tread (110) may be composed of a first synthetic material. Non-limiting examples of the first synthetic material include a woven synthetic fabric, a natural fabric, or PVC. As a non-limiting example, the first synthetic material may exhibit a tensile strength of up to 9,000 or over pounds per inch of width. This tensile strength provides a reduction of stretch of the beadlock tread (110) when the inner tube (134) is exerting a maximum pressure. An example maximum pressure may be 50 psi with a recommended running pressure of 40 psi. The beadlock tread (110) may have a first circumferential edge (120) and a second circumferential edge. Further, a first terminal end of the beadlock tread (112) and a second terminal end of the beadlock tread (114) may overlap such that a pre-determined distance (118) exists between said first and second terminal ends (112,114). An overlap area (116), herein referred to as the tread overlap, comprising a double layer of the first synthetic material, may be defined by the pre-determined distance (118) and a width of the beadlock tread (110).

In additional embodiments, the tread overlap (116) may have a double-W stitching pattern (150) disposed thereon to join the double layer of the first synthetic material together. This double-W stitching pattern (150) may comprise a first set of stitches forming multiple W-shaped patterns and a second set of stitches forming multiple W-shaped patterns rotated 180 degrees relative to the first set of stitches, such that the first set of stitches and the second set of stitches overlap. Additionally, the first set of stitches and the second set of stitches may be embedded in the top, the bottom, or both the top and bottom of the first synthetic material such that an object contacting the surface of the beadlock tread (110) contacts the first synthetic material and not the first or second set of stitches.

In other embodiments, the beadlock case (108) may further comprise a first beadlock sidewall (122) disposed between the first circumferential edge (120) of the beadlock tread (110) and the rim (104) and a second beadlock sidewall (138) disposed between the second circumferential edge of the beadlock tread (110) and the rim (104). In some embodiments, the first (122) and/or second beadlock sidewall (138) may be composed of a PVC material. Each sidewall is affixed circumferentially to the inside (or under) the beadlock tread.

Supplementary embodiments feature a first beadlock bead (140) comprising a second synthetic material symmetrically or asymmetrically folded over a circumferential edge of the first beadlock sidewall (124) and affixed to the first beadlock sidewall (122) via a first stitching (144). The first stitching may be disposed within a given distance from an edge (146) of the first beadlock bead (140). Additionally, a second beadlock bead (142) may comprise a third synthetic material symmetrically or asymmetrically folded over a circumferential edge of the second beadlock sidewall (125) and affixed to the second beadlock sidewall (138) via a second stitching. The second stitching may be disposed within a distance (equal to the previously mentioned given distance) from the edge of the second beadlock bead (142). In some embodiments, this common distance is from 1 millimeters to 2 millimeters. In other embodiments, the second synthetic material and the third synthetic material may be composed of a single type of material. Non-limiting examples of the first and second synthetic materials include woven synthetic fabric, natural fabric, or PVC. In additional embodiments, another pair of stitches, each 7 mm to 8 mm away from the first stitching or second stitching. Thus, there are two rows of stitching joining each beadlock bead to its respective beadlock sidewall.

In further embodiments, the beadlock assembly (100) may also comprise a beadlock air channel (126) joining a main air chamber (130) to a tire valve stem (128) mounted to the rim (104). The main air chamber (130) is an airtight space between the tire (102), when inflated, and the rim (104). Air exiting (or entering) the main air chamber (130) travels through the flexible, non-crushable beadlock air channel (126) and is released (or received) via the tire valve stem (128).

Consistent with previous embodiments, the beadlock assembly (100) may be inserted into the tire (102) and the inner tube (134) may then be inflated via the inner tube valve stem (106) to allow the beadlock assembly (100) to contact the tire (102) at the two inner circumferential tire beads (136). The beadlock assembly (100) may exert a force, at said places of contact, such that the tire (102) may stay in secure contact with the rim (104) even in situations where the inflation pressure of the tire (102) is not sufficient to lock the tire (102) to the rim (104).

The present invention also features a method for effectively securing a tire to a rim utilizing the previously detailed beadlock assembly (100). In some embodiments, the method comprises:
  removing the manufacturer's rim valve stem to create a first opening in the rim;
  creating a second opening in the rim a predetermined distance from the first opening;
  mounting the beadlock case within the tire and around the rim such that the tread overlap is opposite both the first opening and the second opening;
  mounting the inner tube into the beadlock case and around the rim such that the second opening encircles the inner tube valve stem, wherein the inner tube has not been inflated;
  positioning the first beadlock bead and the second beadlock bead over the rim;

installing the beadlock air channel such that the first opening encircles a valve stem of the beadlock air channel;

partially inflating the inner tube until the two inner circumferential tire beads are in air holding contact with the rim;

positioning the two inner circumferential tire beads onto the rim;

deflating the tire and inflating the inner tube fully; and inflating the tire.

The tread overlap is positioned opposite the first and second openings so that the weight of the tread overlap counter balances a combined weight of the inner tube valve stem and the valve stem of the beadlock air channel. In this configuration, the beadlock assembly may exert a force on the two inner circumferential tire beads such that the tire may stay in secure contact with the rim, even when the inflation pressure of the tire is not sufficient to lock the tire to the rim.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A beadlock assembly (100), housed within a tire (102), surrounding a rim (104) upon which the tire (102) is mounted, the beadlock assembly (100) comprises:
   (a) an inner tube (134), encircling the rim (104), having an inner tube valve stem (106) mounted on the rim (104), wherein the inner tube valve stem (106) allows air to enter and exit the inner tube (134); and
   (b) a beadlock case (108) encompassing the inner tube (134), wherein the beadlock case (108) comprises:
      (i) a beadlock tread (110), composed of a first synthetic material, disposed along a circumference of the beadlock case (108), wherein the beadlock tread (110) has a first circumferential edge (120) and a second circumferential edge, wherein a first terminal end of the beadlock tread (112) and a second terminal end of the beadlock tread (114) overlap such that a pre-determined distance (118) exists between said first and second terminal ends (112,114), wherein a tread overlap (116), comprising a double layer of the first synthetic material, is defined by the pre-determined distance (118) and a width of the beadlock tread (110),
      wherein the tread overlap (116) has a double-W stitching pattern (150) disposed thereon to join together each layer of the double layer of the first synthetic material,
      wherein the double-W stitching pattern (150) comprises a first set of stitches forming multiple W-shaped patterns and a second set of stitches forming multiple W-shaped patterns rotated 180 degrees relative to the first set of stitches, wherein the first set of stitches and the second set of stitches overlap;
      (ii) a first beadlock sidewall (122) disposed between the first circumferential edge (120) of the beadlock tread (110) and the rim (104);
      (iii) a second beadlock sidewall (138) disposed between the second circumferential edge of the beadlock tread (110) and the rim (104), wherein the first beadlock sidewall (122) and the second beadlock sidewall (138) are composed of a polyvinyl chloride material ("PVC");
      (iv) a first beadlock bead (140) comprising a second synthetic material folded over a circumferential edge of the first beadlock sidewall (124), wherein a first stitching (144) affixes the first beadlock bead (140) to the first beadlock sidewall (122), wherein the first stitching (144) is disposed within a given distance from an edge (146) of the first beadlock bead (140); and
      (v) a second beadlock bead (142) comprising a third synthetic material folded over a circumferential edge of the second beadlock sidewall (125), wherein a second stitching affixes the second beadlock bead (142) to the second beadlock sidewall (125), wherein the second stitching is disposed within the given distance from an edge of the second beadlock bead (142); and
   (c) a bead lock air channel (126) joining a main air chamber (130) and a tire valve stem (128) mounted to the rim (104), wherein the main air chamber (130) is an air tight space between the tire (102), when inflated, and the rim (104), wherein the tire valve stem (128) allows air to enter and exit the main air chamber (130) through the bead lock air channel (126), wherein the bead lock assembly (100) is housed in the tire (102) such that the beadlock assembly (100) contacts the tire (102) at two inner circumferential tire beads (136), wherein the inner tube (134) disposed within the beadlock assembly (100) is inflated from the inner tube valve stem (106), wherein the beadlock assembly (100) exerts a force on the two inner circumferential tire beads (136) such that the tire (102) stays mounted on the rim (104) even when the inflation pressure of the tire (102) is not sufficient to lock the tire (102) to the rim (104).

2. The beadlock assembly (100) of claim 1, wherein the first synthetic material composing the beadlock tread (110) has a tensile strength sufficient for providing a reduction of stretch of the beadlock tread (110) when the inner tube (134) is exerting a maximum pressure.

3. The beadlock assembly (100) of claim 1, wherein the second synthetic material and the third synthetic material are composed of a single type of material.

4. The beadlock assembly (100) of claim 3, wherein the single type of material is woven synthetic fabric, woven natural fabric, or polyvinyl chloride ("PVC").

5. The beadlock assembly (100) of claim 1, wherein the given distance is between 1 millimeters to 2 millimeters.

6. A method for mounting a tire to a rim, comprising:
(a) providing the beadlock assembly of claim 1;
(b) removing a manufacturer rim valve stem to create a first opening in the rim;
(c) creating a second opening in the rim a predetermined distance from the first opening;
(d) mounting the beadlock case within the tire and around the rim such that the tread overlap is opposite the inner tube valve stem and the valve stem of the beadlock air channel, wherein a weight of the tread overlap counterbalances a combined weight of the inner tube valve stem and the valve stem of the beadlock air channel;
(e) mounting the inner tube into the beadlock case and around the rim such that the second opening encircles the inner tube valve stem, wherein the inner tube is deflated prior to mounting;
(f) positioning the first beadlock bead and the second beadlock bead over the rim;
(g) installing the beadlock air channel such that the first opening encircles the valve stem of the beadlock air channel;
(h) partially inflating the inner tube until the two inner circumferential tire beads are in air holding contact with the rim;
(i) positioning the two inner circumferential tire beads onto the rim;
(j) inflating the inner tube fully; and
(k) inflating the tire,
wherein the beadlock assembly exerts a force on the two inner circumferential tire beads such that the tire stays mounted on the rim (104) even when the inflation pressure of the tire is not sufficient to lock the tire to the rim.

7. A method for producing a beadlock assembly, said method comprising:
(a) fabricating a beadlock case, comprising:
  (i) producing a beadlock tread, comprising:
    (A) providing a first synthetic material of a given width and a given length and a given strength, wherein the given length is longer than the given width, wherein the first synthetic material comprises a first terminal end and a second terminal end;
    (B) joining the first terminal end of the first synthetic material and the second terminal end of the first synthetic material such that a pre-determined distance exists between said first and second terminal ends of the first synthetic material, wherein a tread overlap, comprising a double layer of the first synthetic material, is defined by the pre-determined distance and the given width, wherein joining the first terminal end and the second terminal end of the first synthetic material forms an annular shape of the beadlock tread having a first circumferential edge and a second circumferential edge; and
    (C) stitching the tread overlap with a double-W stitching pattern to bind together the double layer of the first synthetic material, wherein the double-W stitching pattern comprises a first set of stitches forming multiple W-shaped patterns and a second set of stitches forming multiple W-shaped patterns rotated 180 degrees relative to the first set of stitches, wherein the first set of stitches and the second set of stitches overlap;
  (ii) stitching a first beadlock sidewall and a second beadlock sidewall circumferentially to opposite sides of an inside of the beadlock tread, wherein the first beadlock sidewall and the second beadlock sidewall are composed of a PVC material, wherein the first beadlock sidewall is a first annular PVC material stitched to the first circumferential edge of the beadlock tread, wherein the second beadlock sidewall is a second annular PVC material stitched to the second circumferential edge of the beadlock tread, wherein the first beadlock sidewall and the second beadlock sidewall are equal in size and shape;
  (iii) forming a first beadlock bead by folding a second synthetic material over a circumferential edge of the first beadlock sidewall, and stitching the second synthetic material to the circumferential edge of the first beadlock sidewall, wherein said stitching is disposed within a given distance from an edge of the first beadlock bead; and
  (iv) forming a second beadlock bead by folding a third synthetic material over a circumferential edge of the second beadlock sidewall, and stitching the third synthetic material to the circumferential edge of the second beadlock sidewall, wherein said stitching is disposed within the given distance from an edge of the second beadlock bead;
(b) placing an inner tube, having an inner tube valve stem, within the beadlock case; and
(c) providing a bead lock air channel;
wherein the bead lock assembly is inserted into a tire that comprises two inner circumferential tire beads, a tire valve stem, and a main air chamber, wherein the beadlock case is positioned within the tire such that the beadlock case encircles a rim on which the tire is mounted, wherein the beadlock assembly contacts the tire at one of the inner circumferential tire beads and the second beadlock bead contacts the tire at the other circumferential tire bead, wherein the main air chamber is an air tight space between the tire, when inflated, and the rim, wherein the bead lock air channel joins the main air chamber to the tire valve stem, wherein the tire valve stem allows air to enter and exit the main air chamber through the bead lock air channel, wherein the inner tube valve stem is mounted on the rim and allows air to enter and exit the inner tube, wherein when the inner tube (134) disposed within the beadlock assembly (100) is inflated from the inner tube valve stem (106), the beadlock assembly (100) exerts a force on the two inner circumferential tire beads such that the tire (102) stays mounted on the rim (104) even when the inflation pressure of the tire (102) is not sufficient to lock the tire (102) to the rim.

8. The method of claim 7, wherein the second synthetic material and the third synthetic material are composed of a single type of material.

9. The method of claim 7, wherein the given distance is 1 to 2 millimeters.

* * * * *